United States Patent
Kuhlmann et al.

(10) Patent No.: US 9,367,053 B2
(45) Date of Patent: Jun. 14, 2016

(54) SYSTEM AND METHOD FOR COORDINATION OF BUILDING AUTOMATION SYSTEM DEMAND AND SHADE CONTROL

(71) Applicant: Siemens Aktiengesellschaft, Munich (DE)

(72) Inventors: Christian Kuhlmann, Walchwil (CH); Vitus Blumenthal, Reichenburg (CH); Rene Rauchenstein, Lachen (CH)

(73) Assignee: SIEMENS SCHWEIZ AG, Zürich (CH)

( * ) Notice: Subject to any disclaimer, the term of this patent is extended or adjusted under 35 U.S.C. 154(b) by 634 days.

(21) Appl. No.: 13/780,594

(22) Filed: Feb. 28, 2013

(65) Prior Publication Data

US 2013/0261799 A1 Oct. 3, 2013

Related U.S. Application Data

(60) Provisional application No. 61/616,253, filed on Mar. 27, 2012.

(51) Int. Cl.
| | | |
|---|---|---|
| G05B 13/00 | (2006.01) | |
| G05B 13/02 | (2006.01) | |
| E06B 9/32 | (2006.01) | |
| H04L 12/28 | (2006.01) | |

(52) U.S. Cl.
CPC . G05B 13/02 (2013.01); E06B 9/32 (2013.01); H04L 12/2816 (2013.01); *H04L 2012/285* (2013.01)

(58) Field of Classification Search
None
See application file for complete search history.

(56) References Cited

U.S. PATENT DOCUMENTS

| | | | | |
|---|---|---|---|---|
| 6,064,949 | A * | 5/2000 | Werner | G05D 27/02 250/214 AL |
| 7,355,161 | B2 * | 4/2008 | Romig | B60J 3/04 250/221 |
| 7,389,806 | B2 * | 6/2008 | Kates | E06B 9/32 160/310 |
| 7,761,186 | B2 * | 7/2010 | Keller | G05B 15/02 160/5 |
| 7,977,904 | B2 * | 7/2011 | Berman | E06B 9/32 160/5 |
| 2003/0233172 | A1 * | 12/2003 | Granqvist | G05D 23/1924 700/276 |
| 2005/0131554 | A1 | 6/2005 | Bamberger et al. | |
| 2008/0183307 | A1 * | 7/2008 | Clayton | G05B 19/042 700/8 |
| 2009/0254222 | A1 * | 10/2009 | Berman | E06B 9/322 700/275 |
| 2011/0035061 | A1 * | 2/2011 | Altonen | G05B 11/01 700/278 |
| 2011/0220299 | A1 * | 9/2011 | Berman | E06B 9/322 160/5 |
| 2012/0091213 | A1 * | 4/2012 | Altonen | H05B 37/02 236/51 |

FOREIGN PATENT DOCUMENTS

JP 2007120089 A 5/2007

OTHER PUBLICATIONS

Kastner, W et al: "Communication Systems for Building Automation and Control", Proceedings of the IEEE, IEEE. New York, US, vol. 93, No. 6, Jun. 1, 2005 pp. 1178-1203, XP011133110, ISSN: 0018-9219, DOI: 10.1109/JPROC.2005.849726 (25 pages).

(Continued)

*Primary Examiner* — Christopher E Everett

(57) ABSTRACT

Systems, methods, and apparatuses for coordinating and controlling a building automation system (such as building HVAC system) and a building shading system so as to provide efficient energy management and other benefits are provided.

26 Claims, 6 Drawing Sheets

(56) References Cited

OTHER PUBLICATIONS

Felix Iglesias Vazquez et al: "Usage Profiles for Sustainable Buildings", Emerging Technologies and Factory Automation (ETFA), 2010 IEEE Conference ON, IEEE, Piscataway, NJ, USA Sep. 13, 2010, pp. 1-8, XP031937158, DOI: 10.1109/ETFA.2010.5641214, ISBN: 978-1-4244-6848-5 (8 pages).

EP Search Report dated Jul. 12, 2013, for application No. 13160887.9-1862.

EP Office Action dated Sep. 10, 2015, for EP Application No. 13160887.9-1862, 5 pages.

\* cited by examiner

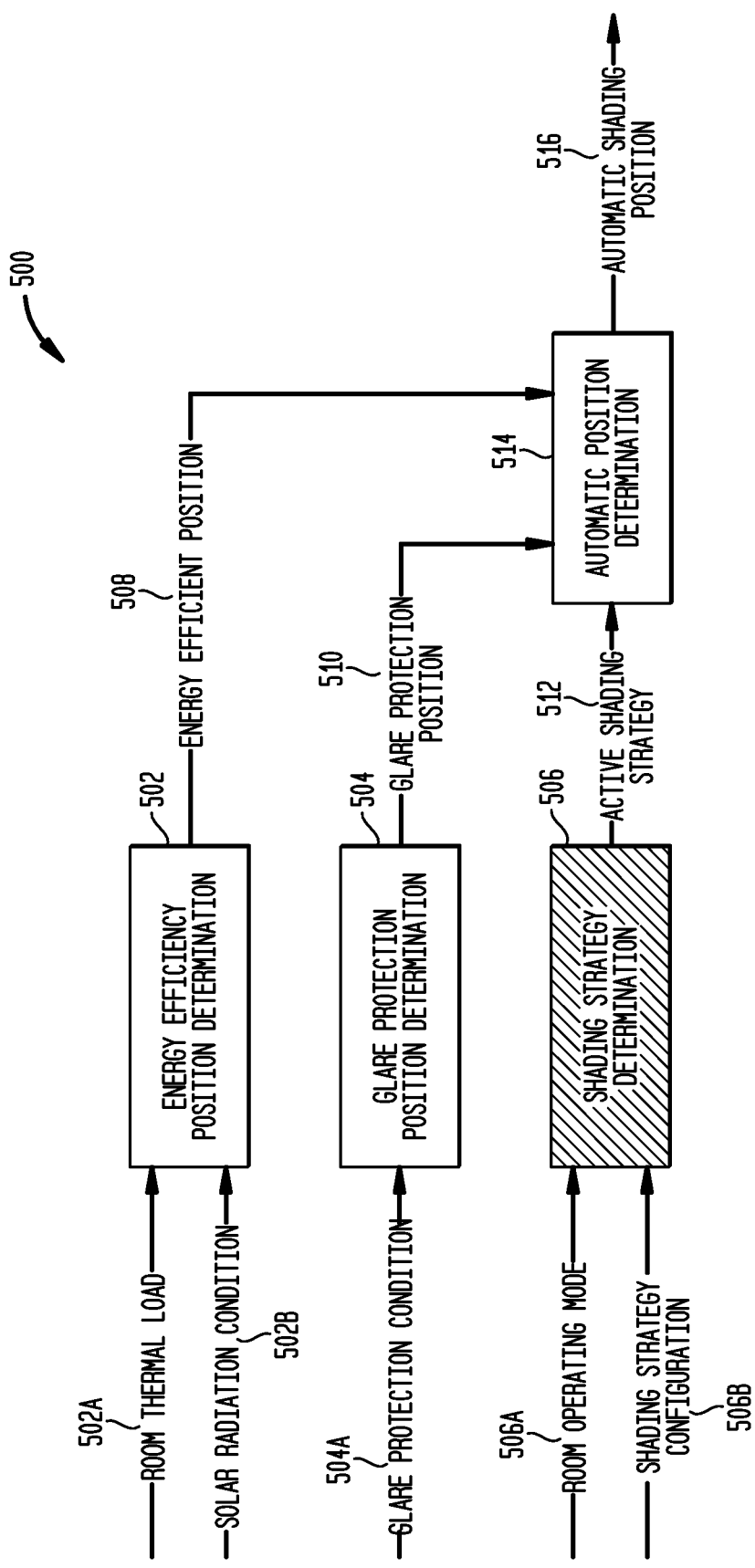

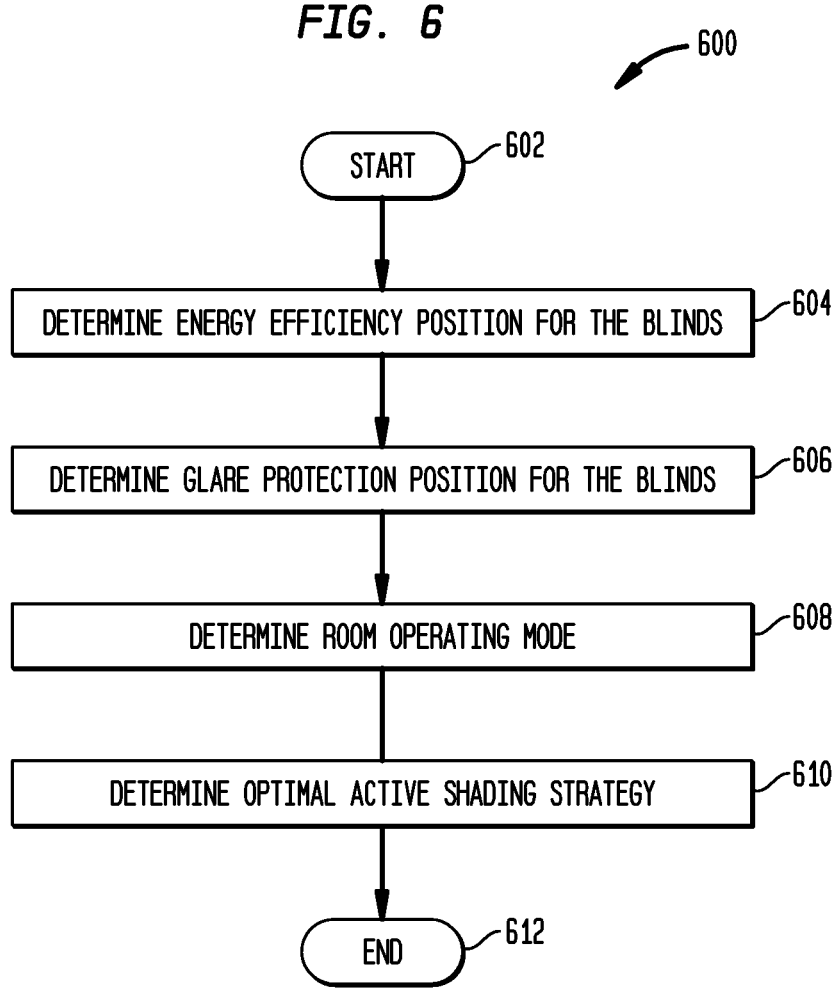

SYSTEM AND METHOD FOR COORDINATION OF BUILDING AUTOMATION SYSTEM DEMAND AND SHADE CONTROL

RELATED APPLICATION

This patent document claims priority under 35 U.S.C. §119 (e) and all other benefits from U.S. Provisional Patent Application No. 61/616,253, titled "SYSTEM AND METHOD FOR COORDINATION OF BUILDING AUTOMATION SYSTEM DEMAND AND SHADE CONTROL," filed Mar. 27, 2012, the content of which is hereby incorporated by reference to the extent permitted by law.

TECHNICAL FIELD

The present invention generally relates to building systems and, more particularly, to systems, processes, and methods for efficiently communicating with a plurality of HVAC devices and shade control devices.

BACKGROUND

A building automation system is an arrangement for monitoring, open-loop control and/or closed-loop control of process variables in complex technical systems in a building, or in a campus comprising a number of buildings. A building automation system typically operates heating, ventilation and air-conditioning systems, lighting and shading devices and also access control, security and fire surveillance systems. In the building automation system process variables—such as room air conditioning variables or events for example—are detected, evaluated, monitored, influenced or generated, with the energy consumption of the building or campus also advantageously being optimized by the building automation system.

Generally, a building automation system encompasses and operates a plurality of what are known as field devices, such as sensors and actuators. Examples of typical field devices are temperature and humidity sensors, air quality sensors, pressure sensors, flow meters, electricity meters, heat meters, brightness sensors, fire alarms, intrusion alarms, alarm or sprinkler devices, drives for hot water valves, thermostat valves, ventilation flaps or blinds, light switches, smart card readers or devices for detecting biometric data. The building automation system typically comprises a plurality of software modules, processes or programs, and in general a number of computers or processors for their activation and also as a rule a plurality of open-loop and closed-loop control devices as well as further devices, for example devices for linking the building automation system to external communication networks, screens of devices for analysis of video signals.

The elements (HVAC objects or field devices) of a building automation system are widely dispersed throughout a facility. For example, an HVAC system includes temperature sensors and ventilation damper controls as well as other elements that are located in virtually every area of a facility. Similarly, a security system may have intrusion detection, motion sensors, and alarm actuators dispersed throughout an entire building or campus. Likewise, fire safety systems include smoke alarms and pull stations dispersed throughout the facility. To achieve efficient and effective building automation system operation, there is a need to monitor the operation of, and often communicate with, the various dispersed elements of a building automation system.

Electrical or wireless communication media are used in a building automation system for the exchange of data of individual devices or parts of systems, as a rule a number of communication networks exist, with cables, optical data communication channels, ultrasound connections, electromagnetic near fields or radio networks able to be used, including fiber optic networks or cellular networks for example. Examples of technologies or standards able to be used for the said data exchange are BACnet, LON or LonWorks® from the company ECHELON, the European Installation bus EIB, KONNEX, ZigBee or PROFIBUS defined by German standard DIN 19245.

Building automation systems typically have one or more centralized control stations in which data from each of the elements in the system may be monitored and in which various aspects of system operation may be controlled and/or monitored. The control station typically includes a computer having processing equipment, data storage equipment, and a user interface. To allow for monitoring and control of the dispersed control system elements, building automation systems often employ multi-level communication networks to communicate operational and/or alarm information between operating elements, such as sensors and actuators, and the centralized control station.

One example of a building automation system control station is the APOGEE® INSIGHT® Workstation, available from Siemens Industry, Inc. of Buffalo Grove, Ill., which may be used with the model APOGEE® building automation system, also available from Siemens Industry, Inc. (APOGEE and INSIGHT are U.S federally registered trademarks of Siemens Industry, Inc.) In this system, several control stations, connected via an Ethernet or another type of network, may be distributed throughout one or more building locations, each having the ability to monitor and control system operation. As a consequence, different people in different locations of the facility may monitor and control building operations.

The typical building automation system (including those utilizing the APOGEE® Insight® Workstation) has a plurality of field panels and/or controllers that are in communication with a workstation. In addition, the building automation system also includes one or more field devices connected to the field panels and/or controllers. Each field device is typically operative to measure and/or monitor various building automation system parameters. In particular, each field device may include one or more sensors and/or actuators to measure and/or monitor corresponding "points" within the respective building and/or building automation system, As referenced herein, a "point" may be (i) any physical input or output to or from a respective controller, field device, sensor or actuator, or (ii) any virtual point associated with a control application or logic object within a controller or field panel that is measured, monitored or controlled. While the workstation is generally used to make modifications and/or changes to one or more of the various components of the building automation system, a field panel may also be operative to enable certain modifications and/or changes to one or more parameters of the system. This typically includes parameters such as a temperature set point or other set points in a field device controller or directly in a field device. In addition, the workstation may be configured to modify a control program or the like in a field panel for controlling a field device.

The efficiency of HVAC heating and cooling devices may be, in part, driven by sunlight emitted into a building. For example, a building have the sun shining directly at a window-filled wall may have an internal temperature warmer than if the windows had blinds or shades operated so as to block all or portion of the entering sunlight. However, it is difficult to coordinate blind/shade control with an HVAC system in an automated matter so as to increase HVAC efficiency and/or improve energy savings.

BRIEF SUMMARY

In a first aspect, a method for determining an active shading strategy within a building automation system is provided, the method including providing a building HVAC system; providing a building shading system; determining an energy efficiency position for one or more shades of the building shading system; determining a glare protection position for the one or more shades of the building shading system; determining a shading strategy configuration for the one or more shades of the building shading system; determining a room operating mode of a room controlled by the building HVAC system; and determining an optimal active shading strategy as a result from the shading strategy configuration and the room operating mode.

In a second aspect a system for coordinating room blinds and a building HVAC system is provided, the system including a building HVAC system; a building shading system comprising room blinds; means for determining a room operating mode of the building HVAC system; means for determining a shading strategy configuration of the building shading system; and means for determining an optimal active shading strategy based on the room operating mode and the shading strategy configuration.

In a third aspect a computer readable storage medium having stored therein data representing instructions executable by a programmed processor for controlling a building shading system is provided, the storage medium including instructions for communicating with a building HVAC system; determining a room operating mode of the building HVAC system; determining a shading strategy configuration of a building shading system; and determining an active shading strategy based on the room operating mode and the shading strategy configuration.

BRIEF DESCRIPTION OF THE SEVERAL VIEWS OF THE DRAWINGS

The embodiments will be further described in connection with the attached drawing figures. It is intended that the drawings included as a part of this specification be illustrative of the exemplary embodiments and should in no way be considered as a limitation on the scope of the invention. Indeed, the present disclosure specifically contemplates other embodiments not illustrated but intended to be included in the claims. Moreover, it is understood that the figures are not necessarily drawn to scale.

FIG. 5 illustrates a system of different shading functions; and

FIG. 6 illustrates a method implemented in a building automation device or field controller for determining an active shading strategy.

DETAILED DESCRIPTION OF PRESENTLY PREFERRED EMBODIMENTS

Figure 1:
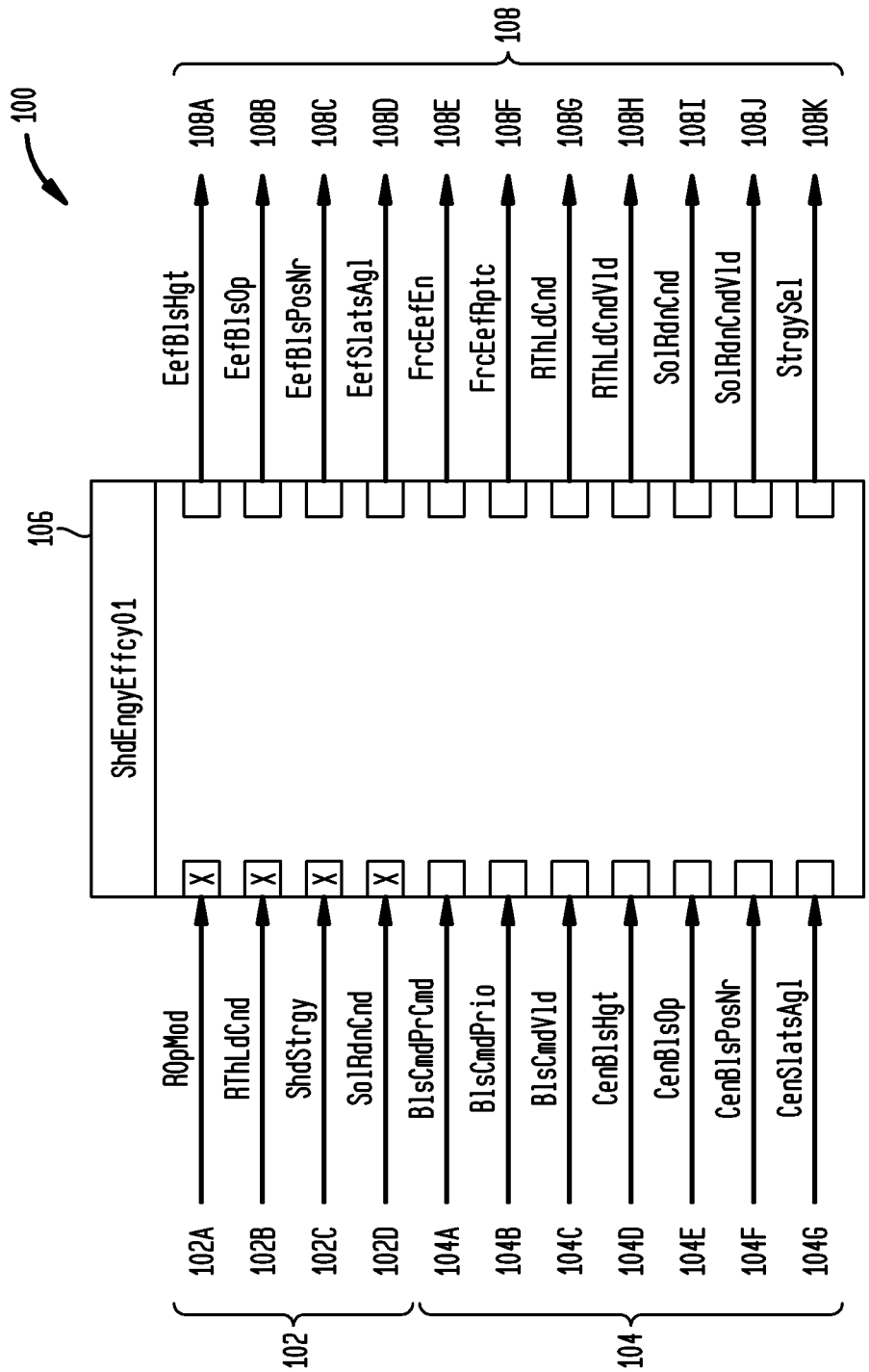
FIG. 1 illustrates a shade energy efficiency control functional block diagram.

The exemplary embodiments provided are illustrative. The present invention is not limited to those embodiments described herein, but rather, the disclosure includes all equivalents. The systems, processes, and methods can be used in any field benefiting from shade control.

Unless otherwise defined, all technical and scientific terms used herein have the same meaning as commonly understood by one of ordinary skill in the art. In case of conflict, the present document, including definitions, will control. Preferred methods and materials are described below, although apparatuses, methods, and materials similar or equivalent to those described herein can be used in practice or testing. All publications, patent applications, patents and other references cited herein are incorporated by reference in their entirety to the extent permitted by law. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

A more detailed description of the embodiments will now be given with reference to FIGS. 1-6. Throughout the disclosure, like reference numerals and letters refer to like elements. The present disclosure is not limited to the embodiments illustrated; to the contrary, the present disclosure specifically contemplates other embodiments not illustrated but intended to be included in the claims.

Because the efficiency of HVAC heating and cooling devices may be, in part, driven by sunlight emitted into a building and because it is difficult to coordinate blind/shade control with HVAC systems in an automated manner so as to increase HVAC efficiency and/or improve energy savings, what is needed is a system, method, and apparatus for providing coordination between a building automation system, such as an HVAC system, and shade control, such as blinds and awnings. Such a system, method, and apparatus provide numerous benefits, including but not limited to, increased HVAC efficiency and energy savings. Numerous other benefits will be apparent.

The embodiments may include processing circuitry/logic configured to access and execute a control program that is stored in memory of a building automation device of field panel controller (such as random access memory, cache memory or other volatile memory storage device or computer readable media) or secondary storage (such as read only memory, non-volatile flash memory, hard drive, memory stick or other non-volatile memory storage device or computer readable media). The control program may be a separate program or a program module of building automation device, shades, and/or awnings. The control program may include an operating system (such as Linux or other conventional operating system). The control program instructs and interacts with a building automation system and/or a building shading system to control one or more devices of the one or more systems.

Each of the building automation system, building shading system, or components parts thereof (including field devices, blinds, and awnings) may be connected to a tool, such as an engineering tool, that may be used to configure and commission the systems for implementation of the embodiments illustrated. Graphical user interface systems employed in such a tool or connected thereto may be used to operatively configure and implement the embodiments.

FIG. 1 illustrates shade energy efficiency control functional block diagram 100. Referring to FIG. 1, Table 1 illustrates the XFBs 102 and summarizes their associated BACnet object connections through the shade energy efficiency interface XFBs 102 are exchange function blocks that are blocks identified in the chart that may be implemented by a control program in a building automation device or field panel to handle the data exchange between the control program and the underlying communication layer that interfaces with the building automation objects and/or field devices required to obtain or transmit the information illustrated in Table 1. A box with an X signifies an XFB as described below; a box without an X signifies an interchart connection as described below also.

TABLE 1

CHT{ShdEngyEffcy01}: Interface

| XFB name (102) | XFB type | Dir. | Description |
|---|---|---|---|
| ROpMod (102A) | R_M | In | Room operating mode → Scheduled room operating mode from room coordination |
| RThLdCnd (102B) | R_M | In | Room thermal load condition → HVAC status information from room coordination |
| ShdStrgy (102C) | R_M | In | Shading strategy → Configuration of shading strategy |
| SolRdnCnd (102D) | R_M | In | Solar radiation condition → Solar radiation condition calculated by the central shading functions based on the measured solar radiation |

Table 2 illustrates interconnections between the charts ("CHT"). As is illustrated in FIG. 1 in conjunction with Table 1, XFB 102 sets the room operating mode 102A, the room thermal load condition 102B, the shading strategy 102C, and the solar radiation condition 102D. Those efficiency interfaces are passed to the shade energy efficiency interface 106. Additional commands and priority values are passed, as illustrated as 104A-104G and passed out are efficiency data 108A-108K, such as blind height 108A, operation 108B, and position number 108C for running at certain energy efficiency aspects.

TABLE 2

CHT{ShdEngyEffcy01}: Interchart connections 104/108

| Funct. Name | Sign. type | Dir. | Description |
|---|---|---|---|
| BlsCmdPrCmd (104A) | Bool | In | Blinds command present command → Indicates the type of the last executed command (Target state or control command) |
| BlsCmdPrio (104B) | Multistate | In | Blinds command priority → Indicates the active priority of the blinds output |
| BlsCmdVld (104C) | Bool | In | Blinds command valid → Indicates whether the information read from the blinds output are valid |
| CenBlsHgt (104D) | Real | In | Central blinds height → Height for blinds calculated by central shading functions |
| CenBlsOp (104E) | Multistate | In | Central blinds operation → Moving command for blinds calculated by central shading functions |
| CenBlsPosNr (104F) | Multistate | In | Central blinds position number → Position number for blinds calculated by central shading functions |
| CenSlatsAgl (104G) | Real | In | Central slats angle → Angle for slats of the blinds calculated by central shading functions |
| EefBlsHgt (108A) | Real | Out | Energy efficiency blinds height → Resulting height for blinds considering energy efficiency aspects |
| EefBlsOp (108B) | Multistate | Out | Energy efficiency blinds operation → Resulting moving command for blinds considering energy efficiency aspects |
| EefBlsPosNr (108C) | Multistate | Out | Energy efficiency blinds position number → Resulting position number for blinds considering energy efficiency aspects |
| EefSlatsAgl (108D) | Real | Out | Energy efficiency slats angle → Resulting angle for slats of blinds considering energy efficiency aspects |
| FrcEefEn (108E) | Bool | Out | Forced energy efficiency enable → Enable commanding the energy efficient position to Automatic mode 3 |
| FrcEefRptc (108F) | Bool | Out | Forced energy efficiency repeat → Trigger to re-command the energy efficient position to Automatic mode 3 |
| RThLdCnd (108G) | Multistate | Out | Room thermal load condition → HVAC status information |
| RThLdCndVld (108H) | Bool | Out | Room thermal load condition valid → Information whether the room thermal load condition is valid |
| SolRdnCnd (108I) | Multistate | Out | Solar radiation condition → Solar radiation condition calculated by the central shading functions |
| SolRdnCndVld (108J) | Bool | Out | Solar radiation condition valid → Information whether the solar radiation condition is valid |
| StrgySel (108K) | Bool | Out | Strategy selector → Selector for either anti-glare protection or energy efficiency shading strategy |

Function: Automatic Energy Efficiency Control.

The control program 106 may include an automatic energy efficiency control that calculates the optimal position of the blinds from an energy efficiency point of view based on the solar radiation condition (from central shading functions) and the room thermal load condition status (from application function ("AF") Room Coordination).

For example, for each combination of SolRdnCnd 102D and RThLdCnd 102B, the position for the blinds may be configured by the control program 106. For all situations a fix position can be configured. For example, for SolRdnCnd=Low, Medium, and High, the control program 106 may choose between the fix position and the centrally calculated position depending on the identified sun position. For SolRdnCnd=High, the control program 106 may choose whether the energy efficiency position is written to the Automatic mode 3 (an illustrative priority mode illustrated in Table 14, below) thus overriding Automatic mode 6 and Manual mode 3 (an illustrative priority mode illustrated in Table 14, below). For some rooms, this may be necessary to ensure overheating protection in case of high solar energy input.

Table 3 illustrates which parameter may apply to which situation:

TABLE 3

| SolRdnCnd (102D) | RThLdCnd (102B) = Load (as illustrated in Table 4) | RThLdCnd (102B) = Unload (as illustrated in Table 4) |
|---|---|---|
| SolRdnCnd = None | FxpLdNoneOp, FxpLdNonePosNr, FxpLdNoneHgt, FxpLdNoneAgl | FxpUnldNoneOp, FxpUnldNonePsn, FxpUnldNoneHgt, FxpUnldNoneAgl |
| SolRdnCnd = Low | BlsPosLdLo FxpLdLoOp, FxpLdLoPosNr, FxpLdLoHgt, FxpLdLoAgl | BlsPosUnldLo FxpUnldLoOp, FxpUnldLoPosNr, FxpUnldLoHgt, FxpUnldLoAgl |
| SolRdnCnd = Medium | BlsPosLdMe FxpLdMeOp, FxpLdMePosNr, FxpLdMeHgt, FxpLdMeAgl | BlsPosUnldMe FxpUnldMeOp, FxpUnldMePosNr, FxpUnldMeHgt, FxpUnldMeAgl |
| SolRdnCnd = High | BlsPosLdHi FxpLdHiOp, FxpLdHiPosNr, FxpLdHiHgt, FxpLdHiAgl FcdModLdHi | BlsPosUnldHi FxpUnldHiOp, FxpUnldHiPosNr, FxpUnldHiHgt, FxpUnldHiAgl FcdModUnldHi |

Table 4 illustrates exemplary configurations.

TABLE 4

| Block Name | Parameter name | Parameter type | Description | Default value |
|---|---|---|---|---|
| ShdParEngyEff | | | Shading parameter for energy efficiency | |
| | BlsPosLdHi | Multistate | Blinds position load high → Choose fix or centrally calculated position. | 2: Fixed position |
| | FxpLdHiOp | Multistate | Fix position load high operation | 1: Move up |
| | FxpLdHiPosNr | Multistate | Fix position load high position number | 0: P0: Closed |
| | FxpLdHiHgt | Real | Fix position load high height | 0.0 [%] |
| | FxpLdHiAgl | Real | Fix position load high angle | 0.0 [%] |
| | FcdModLdHi | Bool | Forced mode load high → Enable writing of energy efficient position to Automatic mode 3. | 0 |
| | BlsPosUnldHi | Multistate | Blinds position unload high → Choose fix or centrally calculated position. | 2: Fixed position |
| | FxpUnldHiOp | Multistate | Fix position unload high operation | 2: Move down |
| | FxpUnldHiPosNr | Multistate | Fix position unload high position number | 0: P0: Closed |
| | FxpUnldHiHgt | Real | Fix position unload high height | 0.0 [%] |
| | FxpUnldHiAgl | Real | Fix position unload high angle | 0.0 [%] |
| | FcdModUnldHi | Bool | Forced mode unload high → Enable writing of energy efficient position to Automatic mode 3. | 0 |
| | BlsPosLdMe | Multistate | Blinds position load medium → Choose fix or centrally calculated position. | 2: Fixed position |

TABLE 4-continued

| Block Name | Parameter name | Parameter type | Description | Default value |
|---|---|---|---|---|
| | FxpLdMeOp | Multistate | Fix position load medium operation | 1: Move up |
| | FxpLdMePosNr | Multistate | Fix position load medium position number | 0: P0: Closed |
| | FxpLdMeHgt | Real | Fix position load medium height | 0.0 [%] |
| | FxpLdMeAgl | Real | Fix position load medium angle | 0.0 [%] |
| | BlsPosUnldMe | Multistate | Blinds position unload medium → Choose fix or centrally calculated position. | 2: Fixed position |
| | FxpUnldMeOp | Multistate | Fix position unload medium operation | 2: Move down |
| | FxpUnldMePosNr | Multistate | Fix position unload medium position number | 0: P0: Closed |
| | FxpUnldMeHgt | Real | Fix position unload medium height | 0.0 [%] |
| | FxpUnldMeAgl | Real | Fix position unload medium angle | 0.0 [%] |
| | BlsPosLdLo | Multistate | Blinds position load low → Choose fix or centrally calculated position. | 2: Fixed position |
| | FxpLdLoOp | Multistate | Fix position load low operation | 1: Move up |
| | FxpLdLoPosNr | Multistate | Fix position load low position number | 0: P0: Closed |
| | FxpLdLoHgt | Real | Fix position load low height | 0.0 [%] |
| | FxpLdLoAgl | Real | Fix position load low angle | 0.0 [%] |
| | BlsPosUnldLo | Multistate | Blinds position unload low → Choose fix or centrally calculated position. | 2: Fixed position |
| | FxpUnldLoOp | Multistate | Fix position unload low operation | 2: Move down |
| | FxpUnldLoPosNr | Multistate | Fix position unload low position number | 0: P0: Closed |
| | FxpUnldLoHgt | Real | Fix position unload low height | 0.0 [%] |
| | FxpUnldLoAgl | Real | Fix position unload low angle | 0.0 [%] |
| | FxpLdNoneOp | Multistate | Fix position load none operation | 2: Move down |
| | FxpLdNonePosNr | Multistate | Fix position load none position number | 0: P0: Closed |
| | FxpLdNoneHgt | Real | Fix position load none height | 0.0 [%] |
| | FxpLdNoneAgl | Real | Fix position load none angle | 0.0 [%] |
| | FxpUnldNoneOp | Multistate | Fix position unload none operation | 1: Move up |
| | FxpUnldNonePsn | Multistate | Fix position unload none position number | 0: P0: Closed |
| | FxpUnldNoneHgt | Real | Fix position unload none height | 0.0 [%] |
| | FxpUnldNoneAgl | Real | Fix position unload none angle | 0.0 [%] |

Function: Determination of Active Automatic Strategy.

Based on the scheduled room operating mode (ROpMod 102A, from AF Room Coordination), and the configuration (ShdStrgy 102C), the control program 106 is able to determine whether the energy efficiency position or the glare protection position is applied as the automatic position. The resulting strategy information is provided to the chart ShdG-lrPrt01 interface 202 as reflected in FIG. 2, which then applies the corresponding position 206A.

Table 5 illustrates which automatic strategy may apply in which situation.

TABLE 5

|  | ShdStrgy = Max. comfort | ShdStrgy = Comfort | ShdStrgy = Balanced | ShdStrgy = Energy saving | ShdStrgy = Max. energy saving |
|---|---|---|---|---|---|
| ROpMode = Comfort | Glare protection | Glare protection | Glare protection | Glare protection | Energy efficiency |
| ROpMode = Pre-Comfort | Glare protection | Glare protection | Glare protection | Energy efficiency | Energy efficiency |
| ROpMode = Economy | Glare protection | Glare protection | Energy efficiency | Energy efficiency | Energy efficiency |
| ROpMode = Protection | Glare protection | Energy efficiency | Energy efficiency | Energy efficiency | Energy efficiency |

Function: Relinquish Control.

Figure 2:
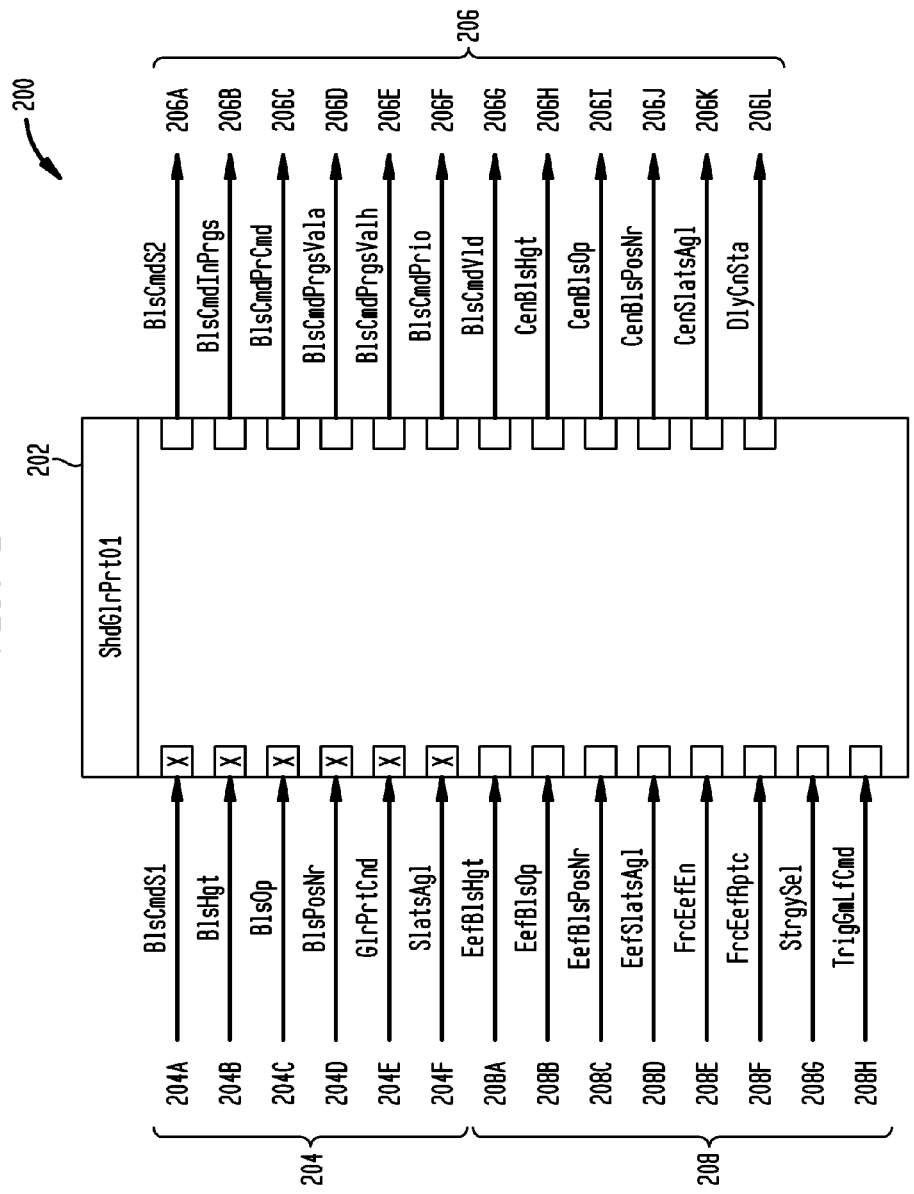
FIG. 2 illustrates an automatic glare control protection functional block diagram.

FIG. 2 illustrates an automatic glare control protection functional block diagram 200 as may be implemented in the control program 202. A box with an X signifies an XFB as described below; a box without an X signifies an interchart connection as described below also. The control program 202 may also include a relinquish control function as it is applied to automatic energy efficiency control that determines the appropriate position of the blinds when a higher mode than Automatic mode 3 (an illustrative priority mode illustrated in Table 14, below) is relinquished. In order to achieve this, the highest active mode is monitored. When the active mode changes from a higher mode to the Automatic mode 3, the energy efficiency blinds position is re-commanded to Automatic mode 3. Thus, the control program 202 permits a device to relinquish its control in lieu of another device.

Table 6 illustrates chart XFBs 204 and summarizes their BACnet object connections. A box with an X signifies an XFB as described below; a box without an X signifies an interchart connection as described below also.

TABLE 6

CHT{ShdGlrPrt01}: Interface

| XFB name | XFB type | Dir. | Description |
|---|---|---|---|
| BlsCmd$1 (204A) | R_BLSCMD | In | Blinds command → Read information from blinds output |
| BlsHgt (204B) | R_A | In | Blinds height → Height for blinds calculated by central shading functions depending on sun position |
| BlsOp (204C) | R_M | In | Blinds operation → Moving command for blinds calculated by central shading functions depending on sun position |
| BlsPosNr (204D) | R_M | In | Blinds position number → Position number for blinds calculated by central shading functions depending on sun position |
| GlrPrtCnd (204E) | R_M | In | Anti-glare protection condition → Condition that indicates whether a potential glare situation exists, calculated by central shading functions based on outside brightness |
| SlatsAgl (204F) | R_A | In | Slats angle → Angle for slats of the blinds calculated by central shading functions depending on sun position |
| BlsCmd$2 (206A) | CMD_BLS | Out | Blinds command → Command position to blinds output. |

Table 7 illustrates interconnections in the same charts (CHT).

TABLE 7

CHT{ShdGlrPrt01}: Interchart connections (208/206)

| Funct. Name | Sign. type | Dir. | Description |
|---|---|---|---|
| EefBlsHgt (208A) | Real | In | Energy efficiency blinds height → Energy efficient height for blinds calculated by chart ShdEngyEffcy |
| EefBlsOp (208B) | Multistate | In | Energy efficiency blinds operation → Energy efficient moving command for blinds calculated by chart ShdEngyEffcy |
| EefBlsPosNr (208C) | Multistate | In | Energy efficiency blinds position number → Energy efficient position number for blinds calculated by chart ShdEngyEffcy |
| EefSlatsAgl (208D) | Real | In | Energy efficiency slats angle → Energy efficient angle for slats of blinds calculated by chart ShdEngyEffcy |
| FrcEefEn (208E) | Bool | In | Forced energy efficiency enable → Enable commanding the energy efficient position to Automatic mode 3 |
| FrcEefRptc (208F) | Bool | In | Forced energy efficiency repeat → Trigger to re-command the energy efficient position to Automatic mode 3 |
| StrgySel (208G) | Bool | In | Strategy selector → Selector for either anti-glare protection or energy efficiency shading strategy |
| TrigGrnLfCmd (208H) | Bool | In | Trigger green leaf command → Trigger to command anti-glare protection position to Manual mode 3 |
| BlsCmdInPrgs (206B) | Bool | Out | Blinds command in progress → Indicates that a command is executed by the blinds (blinds are moving) |

TABLE 7-continued

CHT{ShdGlrPrt01}: Interchart connections (208/206)

| Funct. Name | Sign. type | Dir. | Description |
|---|---|---|---|
| BlsCmdPrCmd (206C) | Bool | Out | Blinds command present command → Indicates the type of the last executed command (Target state or control command) |
| BlsCmdPrgsVala (206D) | Real | Out | Blinds command progress value angle → Indicates the current slats angle |
| BlsCmdPrgsValh (206E) | Real | Out | Blinds command progress value height → Indicates the current blinds height |
| BlsCmdPrio (206F) | Multistate | Out | Blinds command priority → Indicates the active priority of the blinds output |
| BlsCmdVld (206G) | Bool | Out | Blinds command valid → Indicates whether the information read from the blinds output are valid |
| CenBlsHgt (206H) | Real | Out | Central blinds height → Height for blinds calculated by central shading functions |
| CenBlsOp (206I) | Multistate | Out | Central blinds operation → Moving command for blinds calculated by central shading functions |
| CenBlsPosNr (206J) | Multistate | Out | Central blinds position number → Position number for blinds calculated by central shading functions |
| CenSlatsAgl (206K) | Real | Out | Central slats angle → Angle for slats of the blinds calculated by central shading functions |
| DlyOnSta (206L) | Bool | Out | State of switch-on delay → Delay for some functions at start-up |

Function: Preprocessing of Central Blinds Command.

The control program 202 may include central shading functions to provide a blinds command for shading depending on the sun position. The command consists of four values (BlsOp 204C, BlsPosNr 204D, BlsHgt 204B, and SlatsAgl 204F) which are transmitted individually. Different value configurations are contemplated. The preprocessing checks the plausibility and consistency of the four values. (E.g. one signal is already updated, but the other still has its old value).

The value of BlsOp 204C decides which of the other values apply. For example:

BlsOp=Go to position: value of BlsPosNr 204D applies. Used for venetian blinds.

The preprocessing provides the last received set of the four values that is consistent and valid to the automatic control.

Function: Automatic Glare Protection Control.

The control program 202 may include automatic glare protection control which calculates the optimal position of the blinds based on glare protection condition (from central shading functions) to prevent a glare situation in the room while still allowing as much daylight into the room as possible.

For each state of GlrPrtCnd 204E the position for the blinds may be configured. For all situations a fix position can be configured. For GlrPrtCnd=High it can be chosen between the fix position and the centrally calculated position depending on the sun position.

Table 8 illustrates which parameter applies to which situation:

TABLE 8

| GlrPrtCnd 204E | Parameters which apply (as illustrated in Table 9) |
|---|---|
| GlrPrtCnd = None | FxpGlrNoneOp, FxpGlrNonePsn, FxpGlrNoneHgt, FxpGlrNoneAgl |
| GlrPrtCnd = Hold | FxpGlrHldOp, FxpGlrHldPosNr, FxpGlrHldHgt, FxpGlrHldAgl |
| GlrPrtCnd = High | BlsPosGlrPrtHi FxpGlrHiOp, FxpGlrHiPosNr, FxpGlrHiHgt, FxpGlrHiAgl |

Table 9 illustrates a configuration:

TABLE 9

| Block Name | Parameter name | Parameter type | Description | Default value |
|---|---|---|---|---|
| ShdParGlrPrt | | | Shading parameter for anti-glare prot. | |
| | BlsPosGlrPrtHi | Multistate | Blinds position glare protection high → Choose fix or centrally calculated position. | 1: Automatic |
| | FxpGlrHiOp | Multistate | Fix position glare high operation | 8: Go to position |
| | FxpGlrHiPosNr | Multistate | Fix position glare high position number | 2: P2: Anti-glare, sun pos. low |
| | FxpGlrHiHgt | Real | Fix position glare high height | 0.0 [%] |
| | FxpGlrHiAgl | Real | Fix position glare high angle | 0.0 [%] |
| | FxpGlrHldOp | Multistate | Fix position glare hold operation | 8: Go to position |
| | FxpGlrHldPosNr | Multistate | Fix position glare hold position number | 4: P4: Open |

TABLE 9-continued

| Block Name | Parameter name | Parameter type | Description | Default value |
|---|---|---|---|---|
| | FxpGlrHldHgt | Real | Fix position glare hold height | 0.0 [%] |
| | FxpGlrHldAgl | Real | Fix position glare hold angle | 0.0 [%] |
| | FxpGlrNoneOp | Multistate | Fix position glare none operation | 1: Move up |
| | FxpGlrNonePsn | Multistate | Fix position glare none position number | 0: P0: Closed |
| | FxpGlrNoneHgt | Real | Fix position glare none height | 0.0 [%] |
| | FxpGlrNoneAgl | Real | Fix position glare none angle | 0.0 [%] |

Function: Relinquish Control.

The control program 202 may include a relinquish control function as applied to the automatic glare protection control to relinquish control for the appropriate position of the blinds when a higher mode than Automatic mode 6 (an illustrative priority mode illustrated in Table 14, below) is relinquished. In order to achieve this, the highest active mode is monitored. When the active mode changes from a higher mode to the Automatic mode 6, the automatic blinds position is handled according the rules defined in the relinquish control. Thus, the control program 202 permits a device to relinquish its control in lieu of another device.

In case Manual mode 3 (an illustrative priority mode illustrated in Table 14, below) is relinquished and Automatic mode 6 gets active, the automatic blinds position is re-commanded to Automatic mode 6. When the Automatic mode 6 gets active the current automatic position is applied immediately.

In case another mode than Manual mode 3 is relinquished and Automatic mode 6 is active the configuration (FallbackStrgy) defines the behavior. For example:

FallbackStrgy=1: automatic blinds position is re-commanded to Automatic mode 6. When the Automatic mode 6 gets active the current automatic position is applied immediately.

FallbackStrgy=0: No operation is commanded to Manual mode 3. This is used to prevent a move of the blinds when falling back to Automatic mode 6. The automatic is not active after the fallback.

Table 10 illustrates a configuration of function block diagram 200.

TABLE 10

| Block Name | Parameter name | Parameter type | Description | Default value |
|---|---|---|---|---|
| FallbackStrgy | In | Bool | Fallback strategy for falling back to Automatic mode 6 | 1 |

If there are no blinds command available from a central shading function, the parameter BlsPosGlrPrtHi of the automatic glare protection control may be set to support fixed shading positions.

The configuration of shading positions should correspond to the configuration of the blinds type of the TX-I/O-Blinds-Output-Module and the configuration of central shading functions.

Figure 3:
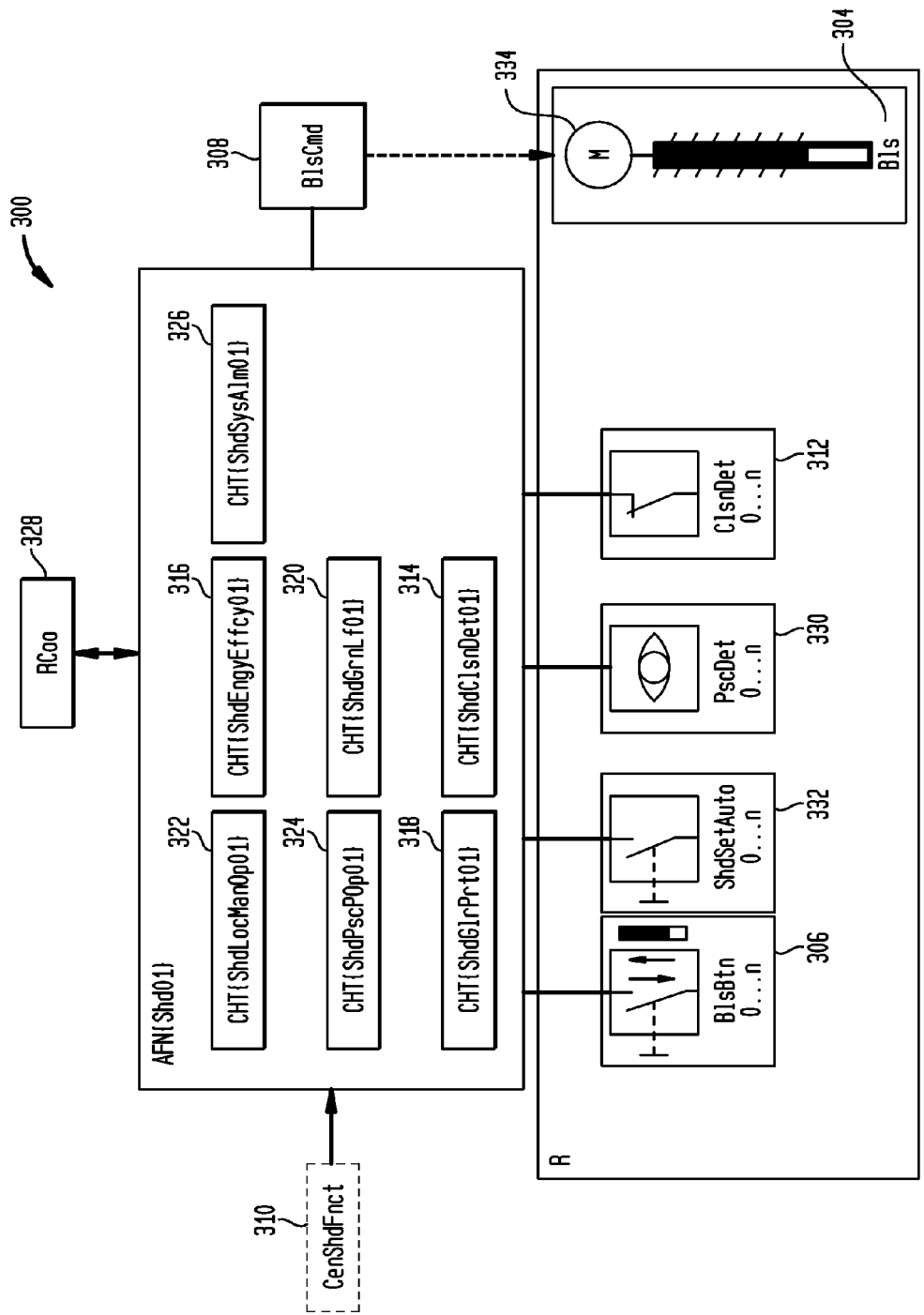
FIG. 3 illustrates an application function for shading daylight with venetian blinds or awnings.

FIG. 3 illustrates a complete application function 300 for shading daylight control with venetian blinds or awnings. It includes automatic blinds control functions 314, 316, 318, 324 and allows manual operation 322 of the blinds by local push buttons as may be implemented through a building automation device or field panel controller.

Table 11 illustrates the elements illustrated in FIG. 3.

TABLE 11

| Legend main diagram | | | |
|---|---|---|---|
| Item | Description | Item | Description |
| Bls (304) | Blinds actuator TX-I/O. | RCoo (328) | AFN: Room coordination. |
| BlsBtn (306) | One or several push buttons for local manual operation of blinds. | M (334) | Motor. |
| BlsCmd (308) | Blinds command. | PscDet (330) | One or several presence detectors for presence depending blinds control. |
| CenShdFnct (310) | Central shading functions. | ShdSetAuto (332) | One or several push buttons for releasing the manual control of blinds and activating the automatic control. |
| ClsnDet (312) | One binary input for detection of collision risks. | | |

Figure 4:
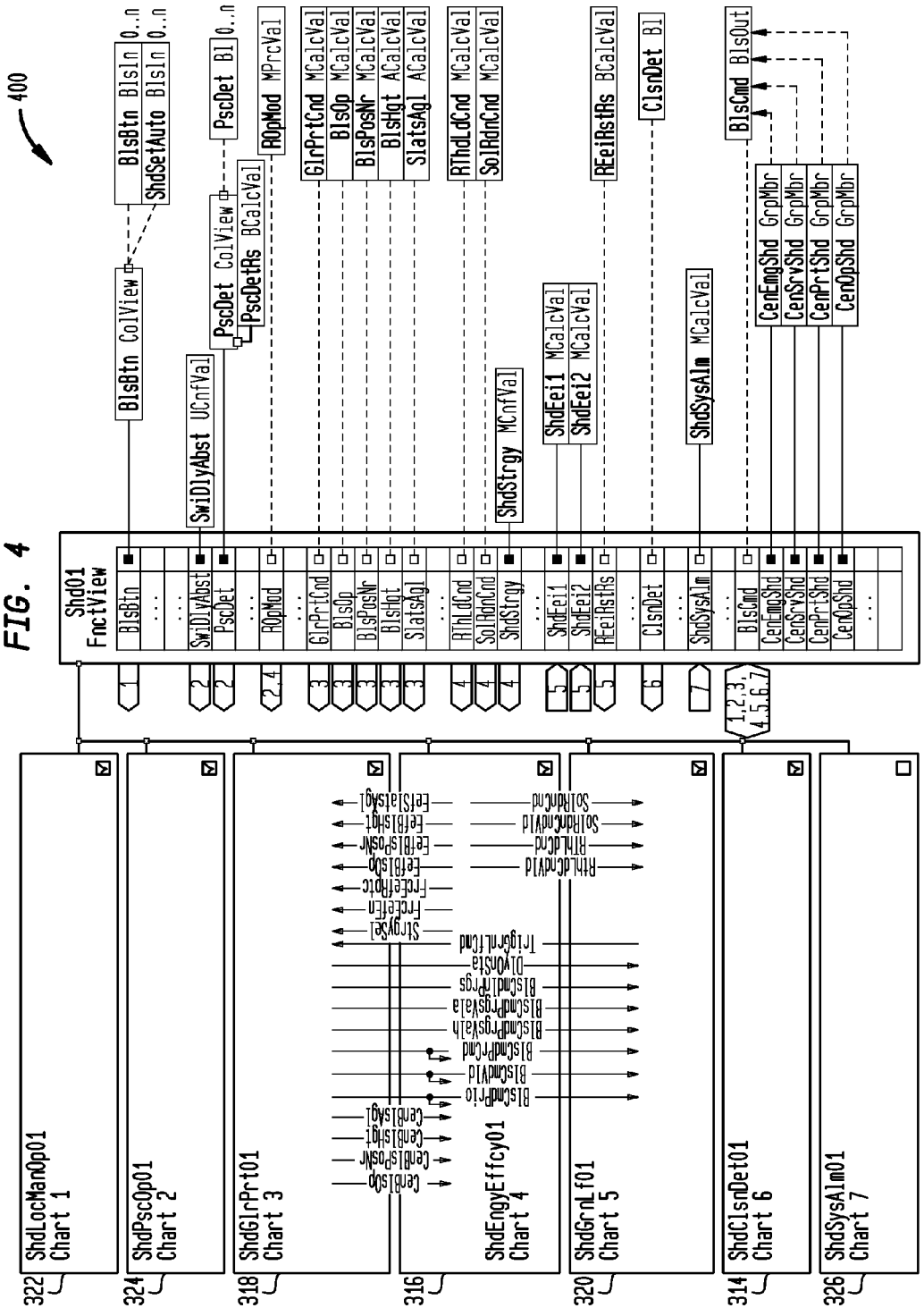
FIG. 4 illustrates primary elements and signal flows for an application shade control coordination function.

FIG. 4 illustrates primary elements and signal flows 400 for an application shade control coordination function. Table 12 illustrates the functions illustrated in FIGS. 4.

TABLE 12

| AFN{Shd01}: Charts | |
|---|---|
| Options | |
| Variants | |
| CHT | Description |
| ☑ — CHT{ShdClsnDet01} (314) | Shading collision detection 01 → Detect the risk of collision between blinds and another movable building parts, e.g. service door. |

TABLE 12-continued

AFN{Shd01}: Charts

| Options | Variants | CHT | Description |
|---|---|---|---|
| ☑ | | CHT{ShdEngyEffcy01} (316) | Shading energy effic. 01, anti-glare prot. → Automatic positioning of the blinds considering solar radiation, HVAC status and room operating mode. Only in connection with CHT{ShdGlrPrt01}. |
| ☑ | | CHT{ShdGlrPrt01} (318) | Shading ant-glare protection 01 → Automatic positioning of the blinds considering outdoor brightness to prevent glare. |
| ☑ | | CHT{ShdGrnLf01} (320) | Shading green leaf 01, energy efficiency → Evaluation of green leaf rules for shading. Only in connection with CHT{ShdEngyEffcy01}. |
| ☑ | — | CHT{ShdLocManOp01} (322) | Shading local manual operation 01 → Local manual control of blinds by means of push buttons. |
| ☑ | — | CHT{ShdPscOp01} (324) | Shading presence operation 01, using presence detector → Occupancy control and relinquish control. |
| ■ | — | CHT{ShdSysAlm01} (326) | Shading system alarm 01 → Alerts problems with the shading actuator's output. |

In conjunction with FIG. 4, Table 13 illustrates an interface of the AFN. As illustrated in Table 13 and FIG. 4, an interface element owns its source if the box in the "own/conn" column is blackened; if the box is not blackened, then it is connected to the device.

TABLE 13

AFN{Shd01}: Interface elements 404

| Interface element | Own/Conn. | Description | Type | Dir. | Source/Sink |
|---|---|---|---|---|---|
| BlsBtn | ☐ | Blinds push button → Push buttons for local manual operation of blinds. | BlsIn: ColView | In | Peripheral device |
| BlsCmd | ☐ | Blinds command → Command to blinds output. | BlsOut | Out | Peripheral device |
| BlsOp | ☐ | Blinds operation → Blinds operation command from central shading function based on sun position. | MCalcVal | In | Central AFN (AFN: CenFcd01) |
| BlsHgt | ☐ | Blinds hight → Blinds height from central shading function based on sun position. | ACalcVal | In | Central AFN (AFN: CenFcd01) |
| BlsPosNr | ☐ | Blinds position number → Blinds position number from central shading function based on sun position. | MCalcVal | In | Central AFN (AFN: CenFcd01) |
| CenEmgShd | ■ | Central emergency for shading products | GrpMbr | -/- | AFN{CenEmgShd01} |
| CenOpShd | ■ | Central operation for shading products | GrpMbr | -/- | AFN{CenOpShd01} |
| CenPrtShd | ■ | Central protection for shading products | GrpMbr | -/- | AFN{CenPrtShd01} |
| CenSrvShd | ■ | Central service for shading products | GrpMbr | -/- | AFN{CenSrvShd01} |
| ClsnDet | ☐ | Collision detector → Switch to detect the position of an object that may block the moving path of the blinds. | BI | In | Peripheral device |
| GlrPrtCnd | ☐ | Anti-glare protection condition → Anti-glare protection condition based on outdoor brightness level. | MCalcVal | In | Central AFN (AFN: CenFcd01) |
| PscDet | ☐ | Presence detector | BI: ColView | In | Peripheral device |
| REeiRstRs | ☐ | Reset result of room energy efficiency indicator → Reset blinds to energy efficient control in case {ShdEei1} or {ShdEei2} indicate poor efficiency. | MCalcVal | In | AFN{RCoo01} |

TABLE 13-continued

AFN{Shd01}: Interface elements 404

| Interface element | Own/Conn. | Description | Type | Dir. | Source/Sink |
|---|---|---|---|---|---|
| ROpMod | ☐ | Room operating mode → Room operating mode from room coordination according scheduler. | MPrcVal | In | AFN{RCoo01} |
| RThLdCnd | ☐ | Room thermal load condition → Room thermal condition from room coordination. | MCalcVal | In | AFN{RCoo01} |
| ShdEei1 | ■ | Shading energy efficiency indicator 1 | MCalcVal | Out | AFN{RCoo01} |
| ShdEei2 | ■ | Shading energy efficiency indicator 2 | MCalcVal | Out | AFN{RCoo01} |
| ShdStrgy | ■ | Shading strategy → Configuration of automatic blinds control strategy. | MCnfVal | In | n/a |
| ShdSysAlm | ■ | Shading system alarm | MCalcVal | Out | AFN{RCoo01} |
| SlatsAgl | ☐ | Slats angle → Slats angle from central shading function based on sun position. | ACalcVal | In | Central AFN (AFN:CenFcd01) |
| SolRdnCnd | ☐ | Solar radiation condition → Solar radiation condition based on solar radiation level. | MCalcVal | In | Central AFN (AF CenFcd01) |
| SwiDlyAbst | ■ | Switch delay to absent → Configuration of delay time for the change from present to absent. | UCnfVal | In | n/a |

Table 14 illustrates priority handling for different types of predefined modes of operation, such that emergency modes are predefined to take priority over protection modes, which take priority over manual modes.

TABLE 14

AFN{Shd01}:

| | Priority | Default priority level | Signal source | |
|---|---|---|---|---|
| Emg | Emergency mode 1 | 1 | -Not used- | -/- |
| | Emergency mode 2 | 2 | AFN{CenEmgShd01} | External |
| | Emergency mode 3 | 3 | AFN{CenSrvShd01} | External |
| Prot | Protection mode 1 | 4 | CHT{ShdClsnDet01} | Internal |
| | Protection mode 2 | 5 | AFN{CenPrtShd01} | External |
| | Minimum On/Off | 6 | -Not used- | -/- |
| Man/Auto | Manual mode 1 | 7 | CHT{ShdLocManOp01} AFN{RCoo01} (scene control) | Internal External |
| | Manual mode 2 | 8 | AFN{CenOpShd01} | External |
| | Automatic mode 1 | 9 | -Not used- | -/- |
| | Automatic mode 2 | 10 | -Not used- | -/- |
| | Automatic mode 3 | 11 | CHT{ShdGlrPrt01} | Internal |
| | Automatic mode 4 | 12 | -Not used- | -/- |
| | Manual mode 3 | 13 | CHT{ShdLocManOp01} CHT{ShdGlrPrt01} CHT{ShdPscOp01} AFN{RCoo01} (scene control) AFN{CenOpShd01} | Internal Internal Internal External External |
| | Automatic mode 5 | 14 | -Not used- | -/- |
| | Automatic mode 6 | 15 | CHT{ShdGlrPrt01} | Internal |
| | Automatic mode 7 | 16 | -Not used- | -/- |

Table 15 illustrates configuration data points.

TABLE 15

AFN{Shd01}: Engineering

| Data point | Description | Type | Enumeration, Max/Min | Default |
|---|---|---|---|---|
| SwiDlyAbst | Switching delay for room occupation when presence detector changes to absent | UCnfVal | 0 ... 5400 Seconds | 1800[s] |
| ShdStrgy | Shading strategy | MCnfVal | (1) Maximum comfort (2) Comfort oriented (3) Balanced (4) Energy saving oriented (5) Maximum energy saving | (3) Balanced |

Table 16 illustrates interface enumerations and illustrative shading strategy configurations.

TABLE 16

AFN{Shd01}: Interface Enumerations

| Data point | Enum. | Description |
|---|---|---|
| ShdStrgy | 1 | Maximum comfort: Shading automatic operates on anti-glare protection for all room operating modes. (The comfort of the room user is paramount. Energy savings are secondary. The blinds are always positioned according glare protection aspects.) |

TABLE 16-continued

AFN{Shd01}: Interface Enumerations

| Data point | Enum. | Description |
|---|---|---|
| | 2 | Comfort oriented:<br>Shading automatic operates on anti-glare protection for the room operating modes 'Comfort/Pre-Comfort/Economy' and on energy efficiency for the room operating mode 'Protection'. (The comfort of the room user is more important than energy savings. If possible the blinds are positioned according to energy saving aspects, but mostly the blinds are positioned according to glare protection aspects.) |
| | 3 | Balanced:<br>Shading automatic operates on anti-glare protection for the room operating modes 'Comfort/Pre-Comfort' and on energy efficiency for the room operating modes 'Economy/Protection'. (Comfort of the room user and energy savings have the same importance. The blinds are positioned according comfort and energy saving aspect in a well-balanced way.) |
| | 4 | Energy saving oriented:<br>Shading automatic operates on anti-glare protection for the room operating mode 'Comfort' and on energy efficiency for the room operating modes 'Pre-Comfort/Economy/Protection'. (Energy savings are more important than the comfort of the room user. If possible the blinds are positioned according to glare protection aspects, but mostly the blinds are positioned according to energy saving aspects) |
| | 5 | Maximum energy saving:<br>Shading automatic operates on energy efficiency for all room operating modes. (Energy savings are paramount. The comfort of the room user is secondary. The blinds are always positioned according energy efficiency aspects.) |

It is preferred that the blinds automatic functions take the HVAC heating/cooling demand into account and how a shading strategy is determined based on the room operating mode. Blinds may be positioned automatically based on energy efficiency aspects or based on glare protection aspects. Often the glare protection position is not the same as the energy efficient position. For example if the sun shines during a cold winter day, the energy efficient position would be the upper end position to let the sun warm the room and save heating energy. At the same time the glare protection position would be a shading position: blinds down and slats of blinds in an angel that does not let direct sunlight into the room. Therefore the two different needs (such as glare protection and energy saving) are preferably evaluated against each other and one of the positions are preferably chosen as the currently active position.

In shading applications, it is preferred (although not required), that the decision between glare protection position and energy efficient position be based on the scheduled room operating mode. The strategy that prevails (glare protection or energy efficiency) in what room operating mode may be configured.

FIG. 5 illustrates system 500 of different shading functions, the information provided to the functions, and the resulting information for each function. An energy efficient position for the blinds (or other shading option) is preferably based on the information about the HVAC heating/cooling demands (Room thermal load) and the energy available from the sun through the window (Solar radiation condition). For example, the room's thermal load 502A and solar radiation condition data 502B are used to determine at block 502 the energy efficiency position of the blinds/shades 508. The glare protection condition 504A is used to determine at block 504 the glare protection position 510. The room operating mode 506A and the shade strategy configuration 506B are used to determine at block 506 the active shading strategy 512. The energy efficiency blind position 508, the glare protection position 510, and the active shading strategy 512 are then used to determine at block 514 the automatic shade position 516.

FIG. 6 illustrates method 600 for determining an active shading strategy which may be employed through an engineering tool or other control program stored in memory or elsewhere to interact with and control a building automation system and a building shading system. At block 602, the method is started. At block 604 an energy efficiency position for the blinds is determined. At block 606 a glare protection position for the blinds (or other shade option) is preferably determined based on the information about the glare situation depending on the outdoor brightness.

At block 608 the room operating mode is then determined. For example, a scheduler defines the room operating mode for the room during the course of the day. The state of the room operating mode is either Comfort, Pre-Comfort, Economy or Protection.

The active shading strategy is then determined at block 610. The shading strategy configuration defines what shading strategy should be active for each of the four room operating mode states.

Five (or more) different settings may be chosen for the exemplary shading strategy configuration, as illustrated in Table 16, above:

1) Maximum comfort;
2) Comfort oriented;
3) Balanced;
4) Energy savings oriented; and
5) Maximum energy savings.

The setting is preferably chosen during engineering and commissioning for the individual building automation project. Default setting is preferably Balanced.

An optimal shading strategy active for the room operating state and the possible configuration settings is determined and the method is ended at 612.

Table 17 illustrates an exemplary optimal shading strategy active for each combination of the room operating states and the possible configuration settings.

TABLE 17

|  | Shading strategy configuration = Maximum comfort | Shading strategy configuration = Comfort oriented | Shading strategy configuration = Balanced | Shading strategy configuration = Energy savings oriented | Shading strategy configuration = Maximum energy savings |
|---|---|---|---|---|---|
| Room operating mode = Comfort | Active shading strategy = Glare protection | Active shading strategy = Glare protection | Active shading strategy = Glare protection | Active shading strategy = Glare protection | Active shading strategy = Energy efficiency |
| Room operating mode = Pre-Comfort | Active shading strategy = Glare protection | Active shading strategy = Glare protection | Active shading strategy = Glare protection | Active shading strategy = Energy efficiency | Active shading strategy = Energy efficiency |
| Room operating mode = Economy | Active shading strategy = Glare protection | Active shading strategy = Glare protection | Active shading strategy = Energy efficiency | Active shading strategy = Energy efficiency | Active shading strategy = Energy efficiency |
| Room operating mode = Protection | Active shading strategy = Glare protection | Active shading strategy = Energy efficiency | Active shading strategy = Energy efficiency | Active shading strategy = Energy efficiency | Active shading strategy = Energy efficiency |

Based on the input information about the active shading strategy either the glare protection position or the energy efficient position is chosen as the automatic position for the blinds. For example, and still referring to Table 17, above, if the room operating mode is presently set to economy and the shading strategy configuration is determined to be configured to comfort oriented, then the corresponding active shading strategy should be set to glare protection, such that the blinds (or other shading device) are configured to prevent glare. Similarly, if the room operating mode is set to protection and the shading strategy is determined to be configured to maximum energy savings, then the corresponding active shading strategy should be set to energy efficiency.

Those of skill in the art will appreciate that embodiments not expressly illustrated herein may be practiced within the scope of the present discovery, including that features described herein for different embodiments may be combined with each other and/or with currently-known or future-developed technologies while remaining within the scope of the claims presented here. It is therefore intended that the foregoing detailed description be regarded as illustrative rather than limiting. It is understood that the following claims, including all equivalents, are intended to define the spirit and scope of this discovery. Furthermore, the advantages described above are not necessarily the only advantages of the discovery, and it is not necessarily expected that all of the described advantages will be achieved with every embodiment of the discovery.

What is claimed is:

1. A method for determining an active shading strategy within a building automation system having a building HVAC system and a building shading system, the method comprising:
   through operation of at least one processor, determining an energy efficiency position for one or more shades of the building shading system;
   through operation of the at least one processor, determining a glare protection position for the one or more shades of the building shading system;
   through operation of the at least one processor, determining a selected shading strategy configuration for the one or more shades of the building shading system, wherein the selected shading strategy configuration is one of a plurality of predetermined different shading strategy configurations that are capable of being individually selected by a user through operation of the building automation system;
   through operation of the at least one processor, determining a scheduled room operating mode of a room controlled by the building HVAC system, wherein the scheduled room operating mode is one of a plurality of predetermined room operating modes that are capable of being individually scheduled through operation of the building automation system;
   through operation of the at least one processor, determining an optimal active shading strategy from among either a glare protection position strategy or an energy efficient position strategy based on the selected shading strategy configuration, the scheduled room operating mode, and predetermined data which correlates different combinations of the predetermined different shading strategy configurations and the predetermined different room operating modes to one of either the glare protection position strategy or the energy efficient position strategy; and
   through operation of the at least one processor, causing room blinds of the building shading system to be configured based on the optimal active shading strategy.

2. The method of claim 1, wherein when the scheduled room operating mode is determined to be comfort and the selected shading strategy configuration is determined to be maximum comfort, the optimal active shading strategy is determined to be the glare protection position strategy.

3. The method of claim 2, wherein when the scheduled room operating mode is determined to be comfort and the scheduled shading strategy configuration is determined to be comfort oriented, the optimal active shading strategy is determined to be the glare protection position strategy.

4. The method of claim 3, wherein when the scheduled room operating mode is determined to be comfort and the scheduled shading strategy configuration is determined to be balanced, the optimal active shading strategy is determined to be the glare protection position strategy.

5. The method of claim 4, wherein when the scheduled room operating mode is determined to be comfort and the scheduled shading strategy configuration is determined to be energy savings oriented, the optimal active shading strategy is determined to be the glare protection position strategy.

6. The method of claim 5, wherein when the scheduled room operating mode is determined to be comfort and the scheduled shading strategy configuration is determined to be maximum energy savings, the optimal active shading strategy is determined to be the energy efficiency position strategy.

7. The method of claim 6, wherein when the scheduled room operating mode is determined to be pre-comfort and the scheduled shading strategy configuration is determined to be maximum comfort, the optimal active shading strategy is determined to be the glare protection position strategy.

8. The method of claim 7, wherein when the scheduled room operating mode is determined to be pre-comfort and the scheduled shading strategy configuration is determined to be comfort-oriented, the optimal active shading strategy is determined to be the glare protection position strategy.

9. The method of claim 8, wherein when the scheduled room operating mode is determined to be pre-comfort and the scheduled shading strategy configuration is determined to balanced, the optimal active shading strategy is determined to be the glare protection position strategy.

10. The method of claim 9, wherein when the scheduled room operating mode is determined to be pre-comfort and the scheduled shading strategy configuration is determined to be energy savings oriented, the optimal active shading strategy is determined to be the energy efficiency position strategy.

11. The method of claim 10, wherein when the scheduled room operating mode is determined to be pre-comfort and the scheduled shading strategy configuration is determined to be maximum energy savings, the optimal active shading strategy is determined to be the energy efficiency position strategy.

12. The method of claim 11, wherein when the scheduled room operating mode is determined to be economy and the scheduled shading strategy configuration is determined to be maximum comfort, the optimal active shading strategy is determined to be the glare protection position strategy.

13. The method of claim 12, wherein when the scheduled room operating mode is determined to be economy and the scheduled shading strategy configuration is determined to be comfort oriented, the optimal active shading strategy is determined to be the glare protection position strategy.

14. The method of claim 13, wherein when the scheduled room operating mode is determined to be economy and the scheduled shading strategy configuration is determined to be balanced, the optimal active shading strategy is determined to be the energy efficiency position strategy.

15. The method of claim 14, wherein when the scheduled room operating mode is determined to be economy and the scheduled shading strategy configuration is determined to be energy savings oriented, the optimal active shading strategy is determined to be the energy efficiency position strategy.

16. The method of claim 15, wherein when the scheduled room operating mode is determined to be economy and the scheduled shading strategy configuration is determined to be maximum energy savings, the optimal active shading strategy is determined to be the energy efficiency position strategy.

17. The method of claim 16, wherein when the scheduled room operating mode is determined to be protection and the scheduled shading strategy configuration is determined to be maximum comfort, the optimal active shading strategy is determined to be the glare protection position strategy.

18. The method of claim 17, wherein when the scheduled room operating mode is determined to be protection and the scheduled shading strategy configuration is determined to be comfort oriented, the optimal active shading strategy is determined to be the energy efficiency position strategy.

19. The method of claim 18, wherein when the scheduled room operating mode is determined to be protection and the scheduled shading strategy configuration is determined to be balanced, the optimal active shading strategy is determined to be the energy efficiency position strategy.

20. The method of claim 19, wherein when the scheduled room operating mode is determined to be protection and the scheduled shading strategy configuration is determined to be energy savings oriented, the optimal active shading strategy is determined to be the energy efficiency position strategy.

21. The method of claim 20, wherein when the scheduled room operating mode is determined to be protection and the scheduled shading strategy configuration is determined to be maximum energy savings, the optimal active shading strategy is determined to be the energy efficiency position strategy.

22. The method of claim 1, further comprising:
determining the scheduled room operating mode via a scheduler based on a time of day; and
determining the selected shading strategy configuration via information provided through a graphical user interface.

23. A system for coordinating room blinds and a building HVAC system, the system comprising:
a building HVAC system;
a building shading system comprising room blinds;
at least one processor configured to:
determine a scheduled room operating mode of the building HVAC system, wherein the scheduled room operating mode is one of a plurality of predetermined room operating modes that are capable of being scheduled through operation of the building automation system;
determine a selected shading strategy configuration of the building shading system, wherein the selected shading strategy configuration is one of a plurality of predetermined different shading strategy configurations that are capable of being individually selected by a user through operation of the building automation system;
determine an optimal active shading strategy from among either a glare protection position strategy or an energy efficient position strategy based on the selected shading strategy configuration, the scheduled room operating mode, and predetermined data which correlates different combinations of the predetermined different shading strategy configurations and the predetermined different room operating modes to one of either the glare protection position strategy or the energy efficient position strategy; and
cause the room blinds of the building shading system to be configured based on the optimal active shading strategy.

24. The system of claim 23, wherein the at least one processor is configured to:
determine the scheduled room operating mode via a scheduler based on a time of day; and
determine the selected shading strategy configuration via information provided through a graphical user interface.

25. In a non-transitory computer readable storage medium having stored therein data representing instructions executable by a programmed processor for controlling a building shading system, the storage medium comprising instructions for:
communicating with a building HVAC system;
determining a scheduled room operating mode of the building HVAC system, wherein the scheduled room operating mode is one of a plurality of predetermined room operating modes that are capable of being individually scheduled through operation of the building automation system;

determining a selected shading strategy configuration of a building shading system, wherein the selected shading strategy configuration is one of a plurality of predetermined different shading strategy configurations that are capable of being individually selected by a user through operation of the building automation system;

determining an optimal active shading strategy from among either a glare protection position strategy or an energy efficient position strategy based on the selected shading strategy configuration, the scheduled room operating mode, and predetermined data which correlates different combinations of the predetermined different shading strategy configurations and the predetermined different room operating modes to one of either the glare protection position strategy or the energy efficient position strategy;

causing room blinds of the building shading system to be configured based on the optimal active shading strategy.

26. The computer readable storage medium of claim 25, the storage medium comprising instructions for:

determining the scheduled room operating mode via a scheduler based on a time of day; and determining the selected shading strategy configuration via information provided through a graphical user interface.

* * * * *